US005504836A

United States Patent [19]
Loudermilk

[11] Patent Number: 5,504,836
[45] Date of Patent: Apr. 2, 1996

[54] PICTURE FRAME WITH ASSOCIATED AUDIO MESSAGE

[76] Inventor: Alan R. Loudermilk, 1550 N. Lake Shore Dr., No. 16B, Chicago, Ill. 60610

[21] Appl. No.: 121,955

[22] Filed: Sep. 15, 1993

Related U.S. Application Data

[63] Continuation of Ser. No. 711,153, Jun. 6, 1991.

[51] Int. Cl.[6] ............................................. G10L 5/00
[52] U.S. Cl. .................... 395/2.81; 395/2.1; 395/2.79
[58] Field of Search ........................ 395/2, 2.79, 2.81;
381/36, 51, 43; 206/232; 360/62; 40/455;
365/230.03, 45

[56] References Cited

U.S. PATENT DOCUMENTS

| | | | |
|---|---|---|---|
| 3,590,525 | 7/1971 | Tomaro | 446/408 |
| 3,857,191 | 12/1974 | Sadorus | 360/2 X |
| 3,975,850 | 8/1976 | Giaume | 40/606 |
| 4,169,970 | 10/1979 | Opiela et al. | 369/69 X |
| 4,222,188 | 9/1980 | Tarrant et al. | 40/455 |
| 4,318,188 | 3/1982 | Hoffmann | 395/2 |
| 4,327,251 | 4/1982 | Fomenko et al. | 381/51 |
| 4,389,541 | 6/1983 | Nakano et al. | 381/51 |
| 4,611,262 | 9/1986 | Galloway et al. | 206/232 |
| 4,696,653 | 9/1987 | McKeefery | 446/303 |
| 4,703,573 | 11/1987 | Montgomery et al. | 40/455 |
| 4,748,756 | 6/1988 | Ross | 40/455 X |
| 4,791,741 | 12/1988 | Kondo | 40/455 X |
| 4,934,079 | 6/1990 | Hoshi | 40/455 X |
| 4,958,150 | 9/1990 | Dabbaj | 40/476 |
| 4,990,092 | 2/1991 | Cummings | 40/455 |
| 5,024,011 | 6/1991 | Collins | 446/220 |
| 5,045,327 | 9/1991 | Tarlow et al. | 395/2.81 |
| 5,136,655 | 8/1992 | Bronson | 381/43 |

FOREIGN PATENT DOCUMENTS

| | | | |
|---|---|---|---|
| 3532259 | 3/1987 | Denmark | 381/51 |
| 8102215 | 8/1981 | WIPO | |

OTHER PUBLICATIONS

Information Storage Devices, Inc., "ISD1012A/1016A/1020A Single Chip Voice Record/Playbook Devices", Feb. 1992, pp. 1–16.

*Primary Examiner*—David D. Knepper

[57] ABSTRACT

A picture frame and accompanying audio message circuit is provided such that one or more desired audio messages stored in the audio message circuit associated with one or more displayed pictures can be played upon the touching of the pictures or the frame. When audio message playback is desired, a switch on the frame or under a protective cover for the picture is activated by touching. Under CPU control, digital information representing the desired audio message is retrieved from a memory device, which is subsequently converted to an analog signal and transmitted to a speaker which produces the desired audio message perceptible to a human. In other embodiments, multiple pictures and multiple messages are provided such that the user can touch a particular picture, or the switch associated with that picture, and an audio message corresponding to that picture is then played through the speaker. In still other embodiments, a system is provided such that an image is captured electronically through a camera or the like. The electronic information representing the picture, and associated electronic information representing the audio message, is then transmitted over a suitable transmission medium such that it is remotely received. On the receiving end, a still picture is produced for insertion into the picture frame, and the received audio message is input into the voice message circuit.

18 Claims, 5 Drawing Sheets

PICTURE FRAME WITH ASSOCIATED AUDIO MESSAGE

This is a continuation of copending application Ser. No. 07/711,153 filed on Jun. 6, 1991.

BACKGROUND OF THE INVENTION

1. Field of the Invention

The present invention relates to pictures and audio messages and more particularly to a picture frame with an audio message circuit in which one or more audio messages associated with displayed picture(s) are played upon touching the picture(s) or the frame.

2. Description of the Prior Art

It is known to display pictures such as photographs of family members or momentous occasions or the like inside of a frame. The frame typically enhances the aesthetics of the displayed picture, provides protection for the picture and/or provides a suitable means for mounting or displaying the picture. Such ordinary frames, however, present a still picture only and do not have an audio message circuit as a part of the frame by which an audio message associated with the displayed picture is played upon touching the picture or the frame.

It is also known in the art to have greeting cards or the like such that when the greeting card is opened, prerecorded tonal music is played. Such prior art devices, however, do not provide a frame for the display of desired pictures, and further do not allow for an arbitrary audio message such as the voice of a user to be activated when desired.

SUMMARY OF THE INVENTION

The present invention overcomes the disadvantages and limitations of the prior art by providing a picture frame and accompanying audio message circuit such that one or more desired audio messages associated with one or more displayed pictures can be played upon the touching of the pictures or the frame. The present invention is particularly suited for integrated and low cost construction such that a picture frame with associated audio message capabilities is provided for displaying momentous or family photographs or for educational purposes.

When audio message playback is desired, a switch on the frame or under a protective cover for the picture (called a "plate" herein) is activated by touching. Under CPU control, digital information representing the desired audio message is retrieved from a memory device, which is subsequently converted to an analog signal and transmitted to a speaker which produces the desired audio message perceptible to a human. In other embodiments, multiple pictures and multiple messages are provided such that the user can touch a particular picture, or the switch associated with that picture, and an audio message corresponding to that picture is then played through the speaker.

In still other embodiments, a system is provided such that an image is captured electronically through a camera or the like. The electronic information representing the picture, and associated electronic information representing the audio message, is then transmitted over a suitable transmission medium such that it is remotely received. On the receiving end, a still picture is produced for insertion into the picture frame, and the received audio message is input into a voice message circuit. With these embodiments, the picture frame and voice message circuit of the present invention can be produced remotely from the origin of the picture and the audio message. Such embodiments have application, for example, for the remote delivery of a commemorative picture and message such as to a sick relative located in a far off location. All of this is accomplished in the prevent invention with an integrated and low cost construction, providing advantages not present in the prior art devices.

Accordingly, it is an object of the present invention to provide a picture frame with an audio message circuit in which one or more audio messages associated with a displayed picture are played upon the touching of the picture or the frame.

Another object of the present invention is to provide a picture frame with multiple pictures, with multiple audio messages associated with each of the displayed pictures, such that a user can initiate playback of an audio message associated with a particular picture by activating a switch associated with that particular picture.

It is another object of the present invention to provide a picture frame that can play an audio message with the audio message in the voice of a desired person.

It is yet another object of the present invention to provide a picture frame in which the audio message is programmable by the user.

It is still another object of the present invention to provide a picture frame in which the audio messages are stored under CPU control such that the audio message playback can be initiated by touching switches on the frame or a switch associated with the picture itself.

Finally, it is an object of this invention to provide a system for providing the picture to be inserted in the frame and the audio message to be stored in the audio message circuit remotely from the point at which the picture and audio message are generated.

DETAILED DESCRIPTION OF THE PREFERRED EMBODIMENT

With reference to the figures, the preferred and alternate embodiments of the present invention will now be described. Although the present invention will be described in terms of pictures or photographs, it should be understood that any fixed object from which a visual image can be perceived, such as sketches, drawings, lettering or the like, or actual objects in a suitable enclosure such as to be framed, also can be utilized with the present invention. Similarly, while the present invention will be described in terms of audio messages such as ordinary human speech, it should be understood that any audio information, such as music, animal or wildlife noises or the like also can be utilized with the present invention.

Figure 1A:
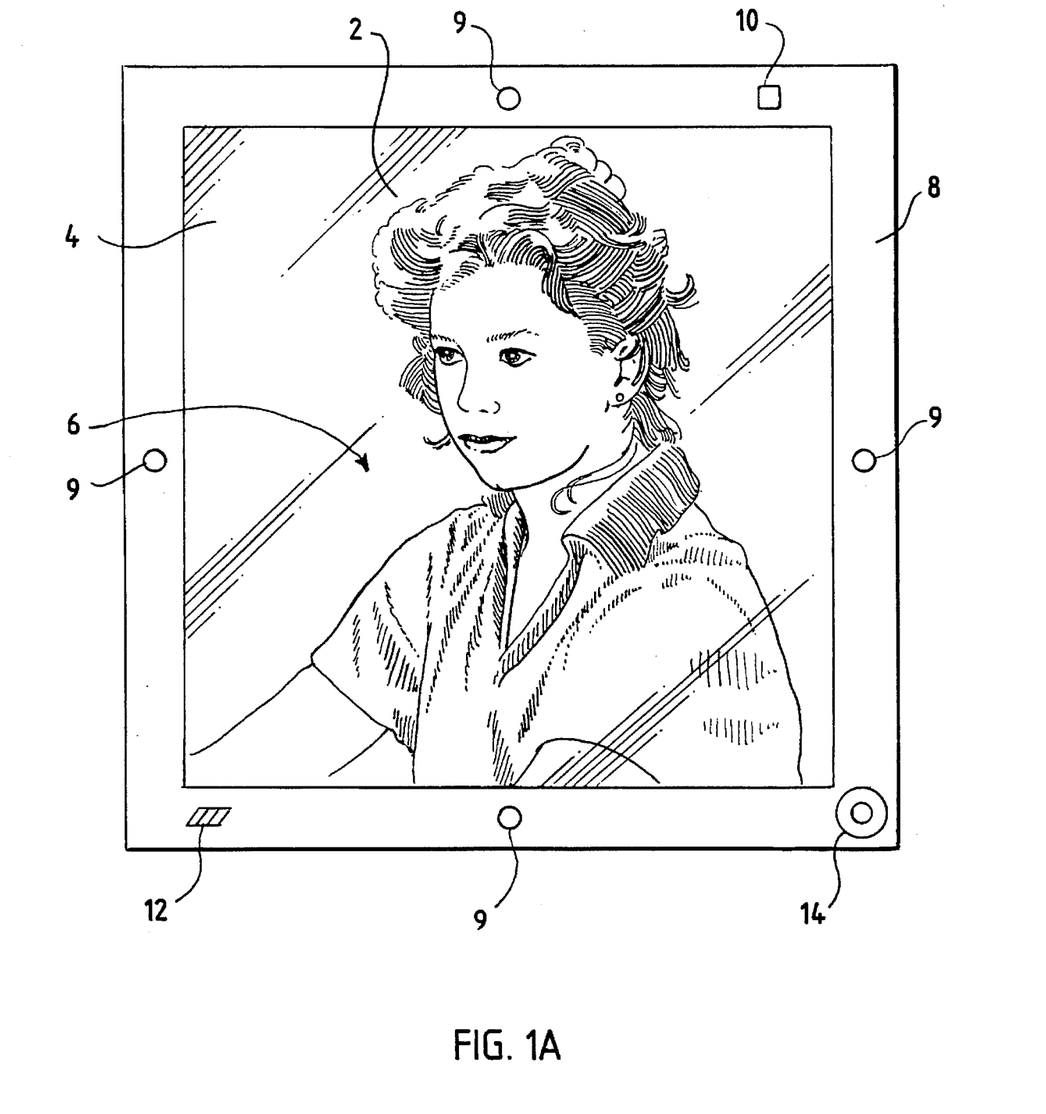
FIG. 1A is an illustration of a single picture embodiment of the present invention.
Figure 1B:
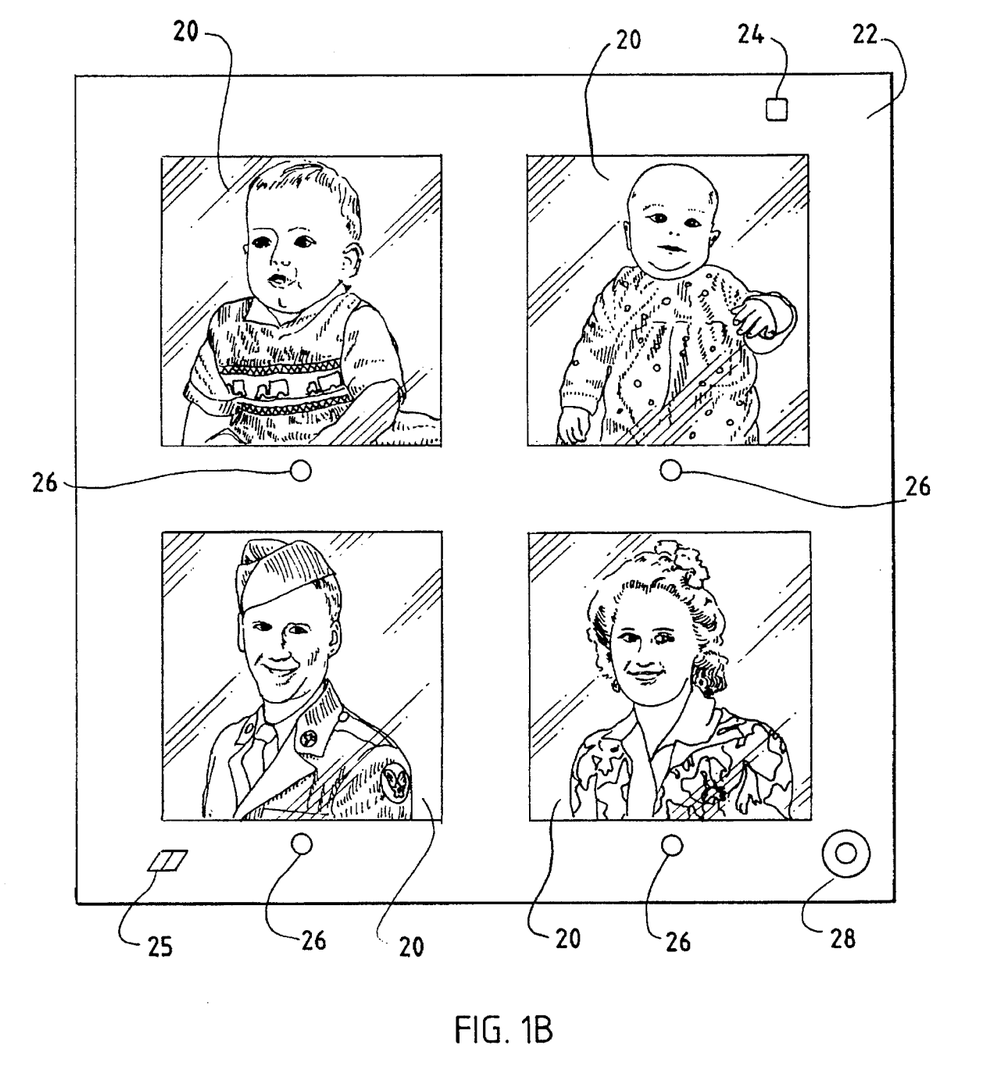
FIG. 1B is an illustration of a multi-picture embodiment of the present invention.

FIGS. 1A and 1B illustrate two embodiments of the present invention. FIG. 1A illustrates picture 2, which can be any fixed image such as a still picture or portrait of a person, inside of frame 8. Picture 2 is affixed to or contained in frame 8 in any suitable way, such as by inserting in grooves or slots (not explicitly shown) in the rear of frame 8 (such as in ordinary picture frames), or may be affixed by way of adhesives or by mounting a retainer plate (not explicitly shown) with screws or the like to frame 8 with picture 2 contained between the retainer plate and frame 8. As used herein, the method of activating the switch mechanism to initiate message playback, such as touching of a touch sensitive capacitive or membrane switch or light shining on a light sensor (discussed below), is referred to as the mode of operation of the switch. Picture 2 is covered by plate 4, which can be any transparent covering, either rigid or flexible, and in the preferred embodiment is glass or plastic. Plate 4 is affixed to frame 8 in any suitable way much as with picture 2 described above.

Attached to frame 8 is speaker 14, from which audio messages are transmitted. The playing of audio messages is initiated by activation of one or more switches 9, which can be located at suitable location(s) around the periphery of frame 8. Switches 9 can be located at other locations on frame 8, such as on the top or bottom of frame 8 (if located on the bottom of frame 8, switch 9 may have a spring offset so that the weight of frame 8 itself does not activate the switch) or on the rear of frame 8. What is important is that a user of the device have a mechanism to initiate playback of audio messages. As indicated by sensor switch 6, the audio message playback initiation also may be accomplished by way of a sensor or switch attached to, or part of plate 4. Sensor switch 6 can be any suitable mechanism, such as a capacitive or membrane switch located under plate 4 or near the periphery of frame 8 so as to be unnoticeable to the user. In such embodiments, audio message playback is initiated by the user directly touching plate 4, which activates sensor switch 6.

In certain embodiments, frame 8 also includes microphone 12, which can be any suitable device for transducing incoming audio information (such as a human voice) into electrical signals for subsequent processing and storage (see discussion of FIG. 2 below). Microphone 12 provides easy user programmability of the audio messages to be replayed, and in particular programmability of the audio messages in the voice of the user or some other desired person. In other embodiments, microphone 12 is not provided, and the audio messages are provided by the manufacturer or supplier of the unit, although even in these embodiments the audio message may be the voice of the user or some other desired person or thing.

With reference to FIG. 1B, another embodiment of the present invention will be described. FIG. 1B illustrates frame 22 containing multiple pictures 20. The embodiment of FIG. 1B also includes multiple audio messages such that one or more messages correspond with each of the displayed pictures. As discussed below, a mechanism is provided for the user to initiate audio message playback of the particular message(s) associated with particular pictures. For example, one picture may be a picture of the user's mother, with the audio message associated with that picture being the mother's voice, while another picture may be a picture of the user's father, with the audio message associated with that picture being the father's voice. The user, such as a child, can touch the picture of the mother (or a switch near the picture of the mother) and hear a message in the mother's voice, and similarly with the picture of the father.

More generally, pictures of a number of persons can be included in the embodiment of FIG. 1B, with specific audio messages associated with each of the persons. In another specific embodiment, the pictures are of selected animals, with the audio messages being information regarding those animals, or wildlife sounds made by the animals themselves. Many other combinations of pictures and audio messages can be utilized in the present invention; the choices are limited only by the imagination of the user.

In FIG. 1B, pictures 20 are covered by multiple plates or a single plate (not explicitly shown, but such plate(s) are similar to plate 4 of FIG. 1A). Pictures 20 and the plate(s) are affixed to frame 22 in any suitable way, much as was described with respect to picture 2, plate 4 and frame 8 of FIG. 1A. Mounted on frame 22 is speaker 28 and, in certain embodiments, microphone 25. Attached to frame 22 are multiple switches 26 associated with pictures 20. Audio message playback of a particular message associated with a particular picture 20 is initiated by touching one of switches 26 associated with the particular picture. As discussed with respect to FIG. 1A, in alternate embodiments the audio message playback is initiated by way of a sensor switch attached to the plate(s) covering pictures 20 (similar to plate 4 and sensor switch 6 of FIG. 1A). In such embodiments, audio message playback of a particular message associated with a particular picture 20 is initiated by directly touching the plate covering that particular picture 20, thereby activating the sensor switch (again, similar to sensor switch 6 of FIG. 1A).

Figure 2:
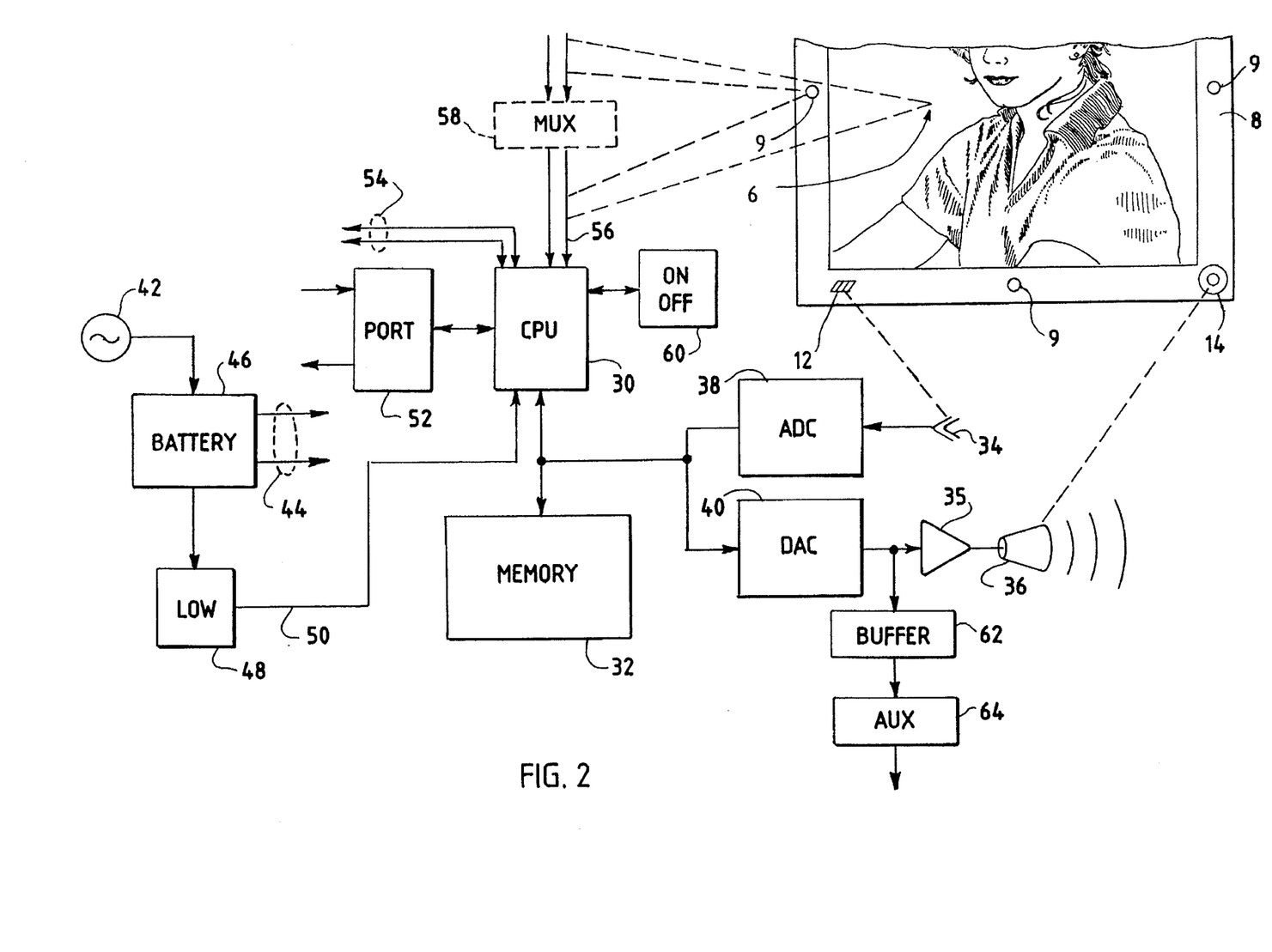
FIG. 2 is a diagram of an embodiment of the audio message circuit of the present invention.

Referring now to FIG. 2, an audio message circuit for use in an embodiment of the present invention will be described. Microphone 34 receives audio information (such as a desired voice message of a user or a desired person or thing) and converts the audio information into electrical signals which are input to analog to digital converter ("ADC") 38. The digital output of ADC 38 is input to CPU 30 for subsequent processing and storage in memory 32. CPU 30 is programmed to provide monitoring of switch inputs 56 and/or switch multiplexer 58, overall circuit coordination and control, and, in the preferred embodiment, compression and expansion of the stored audio message using known compression/expansion techniques. CPU 30 can be any suitable microprocessor or digital processing unit.

Memory 32 can be dynamic or static random access memory ("RAM") (with or without separate battery backup), read only memory ("ROM"), programmable read only memory, either UV or electrically erasable, or non-erasable ("PROM"), or one time programmable memory ("OTP") (a certain type of PROM that is field programmable but only one time), optical disks, memory cards, serial memory (such as bubble memory) or any other suitable device for storing digital information.

For audio message playback, under the control of CPU 30, digital information representing the audio message is output from memory 32 to digital to analog converter ("DAC") 40 over the bus connected to CPU 30 and memory 32. The analog signal output of DAC 40 is connected to amplifier 35, the output of which is connected to speaker 36. Speaker 36 converts the output of amplifier 35 into audio waves perceptible to a human listener. Depending on the desired sound quality, DAC 40 or amplifier 35 may include conventional filtering circuitry for elimination of circuit noise or the like. In alternative embodiments, the output of DAC 40 also is connected to buffer/amplifier 62 which is connected to auxiliary output 64. By use of auxiliary output 64, the present invention may be utilized with a separate external speaker, or the audio messages may be recorded on an external storage device such as a tape recorder (not shown) for purposes of archiving the voice message or the like.

CPU 30 receives control information from control signal input 54 and switch inputs 56. In certain embodiments, switch inputs 56 are received from switch multiplexer 58. Inputs to switch multiplexer 58 include connections from the audio message initiation switches, such as switches 9 or sensor switch 6 of FIG. 1A or switches 26 of FIG. 1B. In response to activation of switches 9 or 26, or sensor switch 6, signals on switch inputs 56 (either directly or through a multiplexer such as multiplexer 58) cause CPU 30 to initiate audio message playback through speaker 36.

In certain embodiments, the audio message to be played back is already in digital form, and thus may be input to CPU 30 by port 52. Port 52 may be any suitable input-output device, serial or parallel, useful for interfacing a CPU to an external digital device. Digital audio information received from port 52 is sent to CPU 30 for processing and storage in memory 32, and for subsequent playback through DAC 40, amplifier 35 and speaker 36. Control of digital information through port 52 may be made by way of control signals 54 in a conventional manner.

Electrical power for the components illustrated in FIG. 2 is provided by power supply 46 over power terminals 44. In the preferred embodiment, power supply 46 is a battery. In other embodiments, power supply 46 is connected to AC power supply 42, which in the preferred embodiment is an ordinary household AC voltage line. In such embodiments, power supply 46 includes circuitry to convert the AC voltage to a suitable DC voltage. In still other embodiments, power supply 46 includes a rechargeable battery, and AC supply 42 supplies current for recharging the battery within power supply 46.

In still other embodiments, power supply 46 has connected to it a circuit for detection and indication of a low battery condition, such as by way of low battery circuit 48. Low battery circuit 48, by way of control line 50, can provide control information to CPU 30 for purposes of, for example, ensuring that the batteries are not completely discharged. In certain embodiments, such as those including a RAM device, upon response from a control signal from low battery circuit 48, CPU 30 disables message playback to conserve the battery charge so as to ensure that the information contained in the RAM is preserved. In other embodiments an indication that the batteries need to be changed or charged is provided to the user by an indicator such as an LED or light (not explicitly shown) in low battery circuit 48.

In the preferred embodiment, the circuit of FIG. 2 is provided with on-off switch 60 such that message playback can be disabled. For example, if the present invention must be transported in a box or suitcase or the like, on-off switch 60 provides a convenient means for ensuring that playback is not initiated by inadvertent touching of switches 9 or sensor switch 6, avoiding problems such as undesired audio message playback and battery discharge. With reference to FIGS. 1A and 1B, on-off switch 60 can be located in an unobtrusive location such as on the rear of frame 8 or 22.

For illustrative purposes, FIG. 2 also shows a fractional view of the embodiment shown in FIG. 1A, with the dashed lines indicating general correspondence between the circuit elements of FIG. 2 and the elements shown on frame 8 of FIG. 1A. As indicated, microphone 34 of FIG. 2 corresponds to microphone 12 of FIG. 1A; speaker 36 of FIG. 2 corresponds to speaker 14 of FIG. 1A; and switch input 56 of FIG. 2 (either directly or through multiplexer 58) corresponds to, for example switches 9 of FIG. 1A (and also sensor switch 6 of FIG. 1A). Similar correspondence could be drawn between elements of FIG. 1B and FIG. 2.

Figure 3:
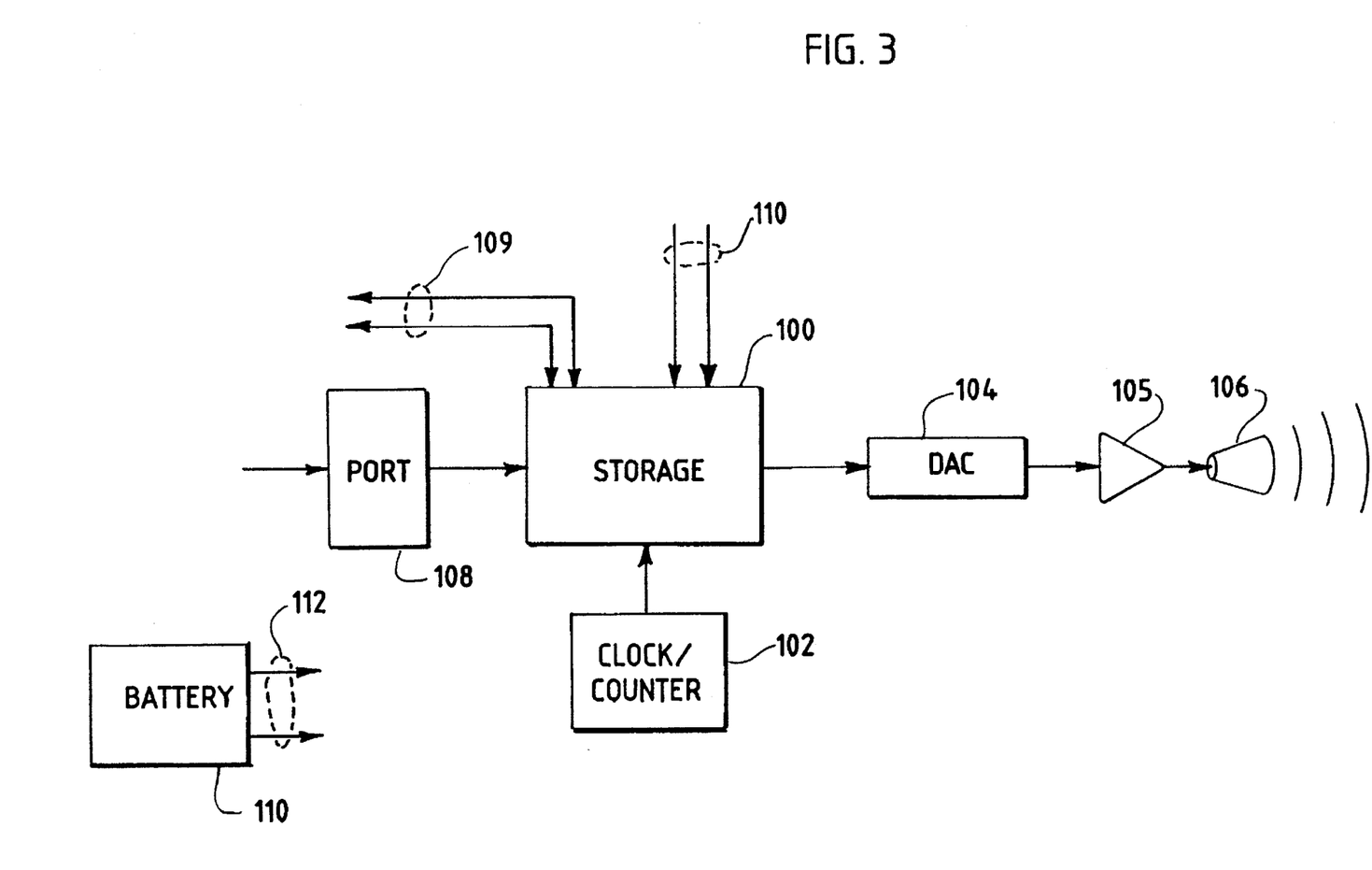
FIG. 3 is a diagram of another embodiment of the audio message circuit of the present invention.

Referring now to FIG. 3, another embodiment of an audio message circuit for use in the present invention will be discussed. Storage circuit 100 contains digital information representing an audio message to be played back, either in compressed or uncompressed form (if compressed, storage circuit 100 also contains a suitable circuit for expansion of the audio message). Digital information is input to storage circuit 100 in the course of manufacturing storage circuit 100 (such as a mask layer PLA or a programmed read only memory device) or may be input by way of port 108 (in the event storage circuit 100 includes, for example, a writable random access memory device or a programmable read only memory device), under control of control input 109. In other embodiments, storage circuit 100 is externally programmed before it is inserted into the circuit shown in FIG. 3. Power supply 110 over power terminals 112 provides power to the circuit elements of FIG. 3 in a manner similar to that of power supply 46 discussed in reference to FIG. 2. In other embodiments, storage circuit 100 is a CPU and memory, such as CPU 30 and memory 32 of FIG. 2.

Message playback from storage circuit 100 is initiated by switch 110. Switch 110 may be, for example, switches 9 or sensor switch 6 of FIG. 1A or switches 26 of FIG. 1B. Under control of counting/clocking circuit 102, digital information is received from storage circuit 100, input into DAC 104, with the resulting audio signals applied to amplifier 105, the output of which is connected to speaker 106, by which the audio message is played.

While the embodiments illustrated in FIGS. 2 and 3 store the audio message in digital form, in other embodiments, the audio message is stored in analog form such as on a magnetic tape, phonograph recording(s) or the like.

In still other embodiments of the present invention, light activation of audio message playback is provided. Light sensor 10 of FIG. 1A and light sensor 24 of FIB. 1B generate control signals in response to receiving light that exceeds a threshold intensity. In response to this control signal, which can be input to CPU 30 by way of switch inputs 56 (for example), audio message playback is initiated by CPU 30. In these embodiments, a special message can be played in response to light activation (such as a "good morning" message) as opposed to a possibly different message played in response to switch activation.

Figure 4:
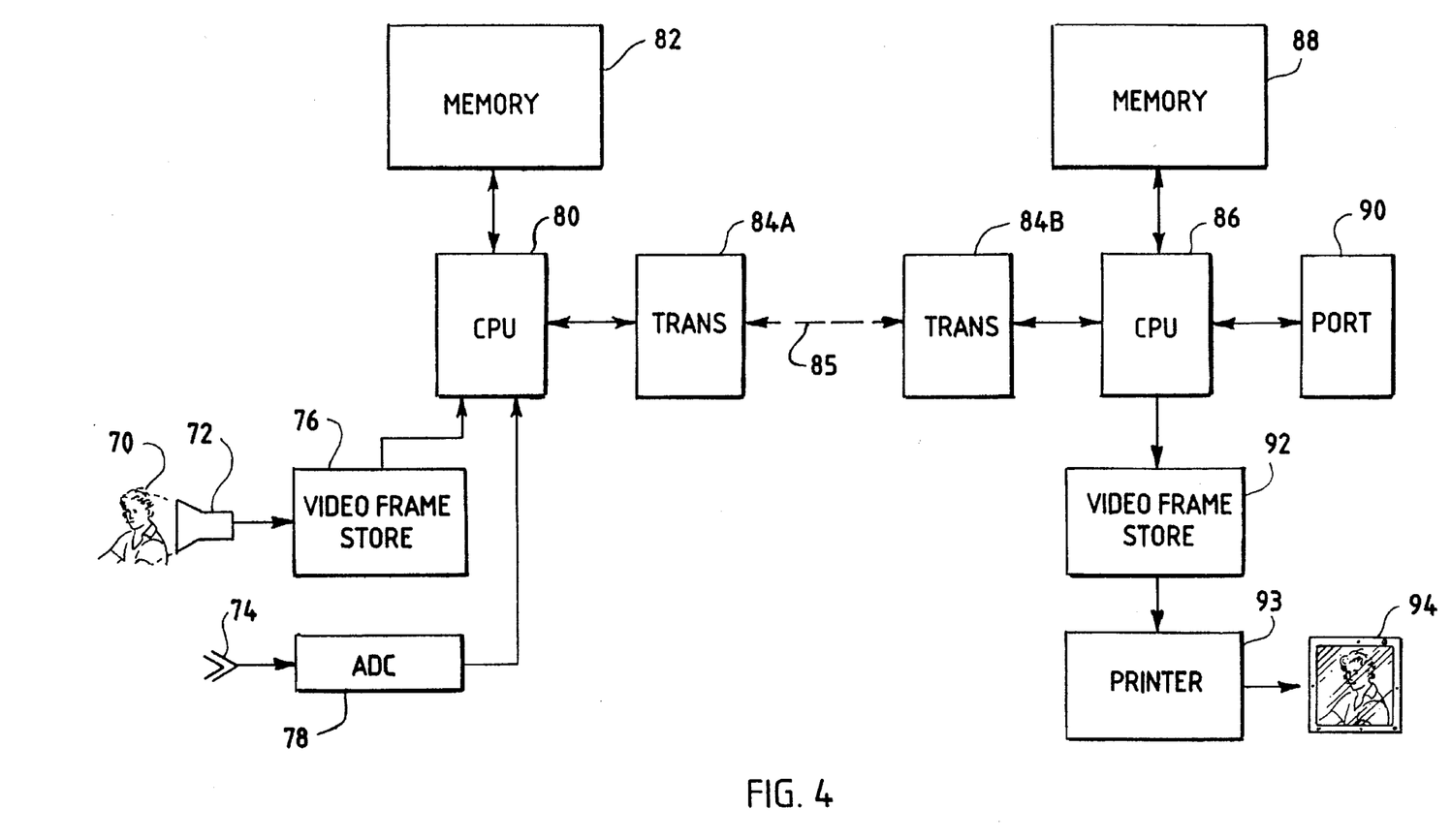
FIG. 4 is a diagram of an embodiment of the remote transmit/receive circuit of the present invention.

With reference to FIG. 4, a system and method for remotely transmitting pictures and audio messages for use in the present invention will now be described. Camera 72 electronically captures a suitable image, such as an image of person 70. Analog information from camera 72 is input to video frame store 76. Video frame store 76 can be any of a number of conventional devices for receiving the output of a video camera and producing an electrical representation (in the preferred embodiment digital) of a particular frame of the video image produced by the video camera. Under control of CPU 80, digital information output from video frame store 76, representing the desired picture or image information, is stored in memory 82. As with memory 32 of FIG. 2, memory 82 may be any suitable memory or digital storage device. In other embodiments, the desired picture already exists, and in lieu of camera 72, an electrical representation of the picture is produced by a conventional scanning device, the output of which is coupled to CPU 80.

The desired audio message is input to microphone 74, the analog output of which is input to ADC 78. Under control of CPU 80, the digital output of ADC 78 representing the desired audio message is stored in memory 82.

Under control of CPU 80, digital information representing the audio message and desired picture is retrieved from memory 82 and transmitted to transceiver 84A. Transceiver 84A transmits this digital information over transmission link 85 where it is subsequently received by transceiver 84B. Transceiver 84A and 84B and transmission link 85 may be any suitable combination of devices and media such that digital information may be transmitted from one point to a remote location. In the preferred embodiment, transceivers 84A and 84B are conventional modems, and transmission medium 85 is an ordinary phoneline. Also in the preferred embodiment, CPU 80 and CPU 86 perform coordinated error checking and correction in a conventional manner to ensure the integrity of the transmitted digital information. In other embodiments, high speed digital and/or analog transmit and receive devices are used over suitable media, such as dedicated phone lines, dedicated data lines, satellite links and the like.

The information received from transceiver 84B is stored in memory 88 under control of CPU 86. Also under control of CPU 86, digital information representing a desired picture or image (such as a picture of person 70) is transmitted to video frame store 92. Video frame store 92 may be any conventional device which produces an output suitable for input to printer 93. Printer 93 produces a hard copy form of the picture of the desired quality. Printer 93 can be a traditional photo generating device, hard copy video printer or a high quality inkjet graphics printer or the like. The output of printer 93 is a hard copy picture, such as picture 94.

Picture 94 may be then utilized such as picture 2 in FIG. 1A or one of pictures 20 of FIG. 1B. Under the control of CPU 86, digital information representing the audio message can be output from port 90 to a suitable storage device. Such a storage device can be memory 32 (under control of CPU 30) of FIG. 2, or it can be storage circuit 100 of FIG. 3. Audio message playback can then be initiated as discussed with respect to FIGS. 1A, 1B, FIG. 2 and 3. For use with the embodiment of FIG. 1B, multiple pictures and multiple audio messages are transmitted and received using the circuit of FIG. 4.

CPU 80 and CPU 86 are illustrated in FIG. 4 electrically connected to other circuit elements by way of separate wires or buses. In other embodiments CPU 80 and CPU 86 are electrically connected to other circuit elements by way of a single bus similar to CPU 30 of FIG. 2.

While the present invention has been described in terms of preferred and alternative embodiment, it will be obvious to one skilled in the art that many alternations and modifications may be made without substantially departing from the spirit of the invention. Accordingly, it is intended that all such alternations and modifications be included in the spirit and scope of the invention as defined by the appended claims.

I claim:

1. A picture frame for displaying a still picture and for programming into the picture frame and audibly playing electrical representations of at least first and second user-programmable audio messages associated with the displayed picture, comprising:

a frame adapted for displaying the still picture;

audio storage means for storing the electrical representations of the user-programmable audio messages associated with the displayed still picture, the audio storage means being attached to the frame;

microphone means coupled to the voice storage means for generating the electrical representations of the audio messages, wherein the user programs the user-programmable audio messages into the storage means with the microphone means;

a transparent plate attached to the frame and covering the displayed picture and through which the displayed picture is visible;

at least first and second switch means for initiating the audible playing of the electrical representations of the user-programmable audio messages associated with the displayed still picture, the at least first and second switch means being coupled to the frame and to the audio storage means, wherein the first switch means is activated in accordance with a first mode of operation, and the second switch means is activated in accordance with a second mode of operation; and speaker means for transducing the electrical representations of the user-programmable audio messages and audibly playing the user-programmable audio messages associated with the displayed still picture, the speaker means being coupled to the audio storage means, wherein the first user-programmable audio message associated with the displayed still picture is played through the speaker means in response to the activation of the first switch means in accordance with the first mode of operation, and wherein the second user-programmable audio message associated with the displayed still picture is played through the speaker means in response to the activation of the second switch means in accordance with the second mode of operation.

2. The picture frame as claimed in claim 1, wherein the first switch means comprises a touch sensitive switch and the first mode of operation comprises the user touching the touch sensitive switch, and wherein the second switch means comprises a light sensor coupled to the audio message means and the second mode of operation comprises the light sensor receiving light that exceeds a threshold intensity.

3. The picture frame as claimed in claim 1 wherein the audio storage means comprises a processing unit and a memory means, wherein the electrical representations of the audio messages associated with the displayed picture are stored in the memory means.

4. The picture frame of claim 2, wherein the first switch means is operable in response to the user touching the transparent plate, wherein the audible playing of the electrical representation of the first user-programmable audio message associated with the displayed still picture is initiated in response to the user touching the transparent plate.

5. In a picture frame for displaying a still picture and for programming into the picture frame and audibly playing at least first and second user-programmable audio messages associated with the displayed picture, the apparatus having a picture, a transparent plate covering the picture, at least first and second switches, wherein the first switch is activated in accordance with a first mode of operation, and the second switch is activated in accordance with a second mode of operation, an audio storage device storing electrical representations of the audio messages and a speaker, a method for programming and playing the user-programmable audio messages associated with the picture comprising the steps of:

programming the first and second user-programmable audio messages into the audio storage device;

activating the first switch in accordance with the first mode of operation;

retrieving the electrical representation of the first user-programmable audio message associated with the displayed picture from the audio storage device in response to activation of the first switch in accordance with the first mode of operation;

playing the first user-programmable audio message associated with the displayed picture through the speaker, wherein the user-programmable audio message is played through the speaker in response to activation of the first switch in accordance with the first mode of operation;

activating the second switch in accordance with the second mode of operation;

retrieving the electrical representation of the second user-programmable audio message associated with the displayed picture from the audio storage device in response to activation of the second switch in accordance with the second mode of operation; and playing the second user-programmable audio message associated with the displayed picture through the speaker, wherein the user-programmable audio message is played through the speaker in response to activation of the second switch in accordance with the second mode of operation.

6. The method as claimed in claim 5 wherein the picture frame includes a battery, the method further comprising the steps of detecting a low condition of the battery and disabling playing of the user-programmable audio messages, wherein the battery charge is conserved, wherein the user-programmable audio messages are preserved in the picture frame.

7. The method as claimed in claim 5 wherein the first switch comprises a touch sensitive switch and the first mode of operation comprises the user touching the touch sensitive switch, and wherein the second switch comprises a light sensor coupled to the audio storage device and the second mode of operation comprises the light sensor receiving light that exceeds a threshold intensity.

8. The method of claim 7, wherein the first switch is operable in response to the user touching the transparent plate, wherein the audible playing of the electrical representation of the first user-programmable audio message associated with the displayed still picture is initiated in response to the user touching the transparent plate.

9. An apparatus for displaying a plurality of still pictures and for audibly playing a plurality of electrical representations of audio messages associated with the plurality of pictures, wherein each of the displayed pictures has a particular audio message associated therewith, the apparatus comprising:

a frame for displaying the plurality of still pictures;

audio storage means attached to the frame for storing the electrical representations of the audio messages associated with the plurality of pictures;

microphone means coupled to the audio storage means for generating the electrical representations of the audio messages, wherein the user programs the plurality of user-programmable audio messages with the microphone means into the audio storage means;

one or more transparent plates attached to the frame and covering the displayed pictures and through which the displayed pictures are visible;

a plurality of switch means attached to the frame for initiating the audible playing of the electrical representations of the audio messages stored in the audio storage means, wherein each switch means corresponds to a particular one of the plurality of pictures, and wherein the plurality of switch means are coupled to the audio storage means and are activated in response to touching by a user; and control means for controlling the audible playing of the electrical representations of the audio messages stored in the audio storage means, wherein the control means is coupled to the plurality of switch means and to the audio storage means, wherein the control means initiates the audible playing of the electrical representation of the audio message associated with a particular displayed picture in response to the activation of the switch means that corresponds to that particular displayed picture; and speaker means for transducing the electrical representations of the audio messages and audibly playing the audio messages, wherein the audio message associated with a particular picture is played through the speaker means in response to touching by the user.

10. The apparatus as claimed in claim 9 wherein the plurality of switch means are operable in response to touching by the user of the one or more transparent plates, wherein the control means initiates the audible playing of the electrical representation of the audio message associated with a particular displayed picture in response to touching of the one or more transparent plates at a point in proximity to the particular displayed picture that corresponds to the audio message.

11. The apparatus as claimed in claim 9 wherein the audio storage means and control means comprise a processing unit and a memory means, wherein the electrical representations of the audio messages associated with the displayed pictures are stored in the memory means.

12. In an apparatus for displaying a plurality of still pictures and for playing audio messages associated with the displayed still pictures, the apparatus having still pictures secured in a picture frame, one or more transparent plates covering the pictures, a plurality of switches corresponding to the plurality of pictures, an audio storage device storing electrical representations of the audio messages and a speaker, wherein each of the displayed pictures has a particular audio message associated therewith, a method for programming and playing a user-programmable audio message associated with a particular one of the plurality of pictures comprising the steps of:

programing the electrical representations of user-programmable audio messages into the audio storage device;

touching of the apparatus by a user at a point corresponding to the particular picture;

activating the switch corresponding to the particular picture in response to the touching by the user;

retrieving the electrical representation of the audio message associated with the particular picture from the audio storage device; and playing the audio message associated with the particular picture through the speaker, wherein the audio message associated with the particular picture is played in response to the touching by the user.

13. The method as claimed in claim 12 wherein the control signal is generated in response to touching by the user of the transparent plate at a point in proximity with the particular picture.

14. A method for producing a still picture and an audio message associated with the still picture in a frame at a remote location, comprising the steps of:

generating an electrical representation of the picture;

generating an electrical representation of the audio message;

transmitting the electrical representations of the picture and the audio message over a transmission medium coupled to the remote location;

receiving the electrical representations of the picture and the audio message from the transmission medium at the remote location;

producing the still picture from the received electrical representation of the picture;

inserting the produced picture into a frame having attached thereto a switch coupled to a voice message circuit coupled to a speaker; and storing the received electrical representation of the audio message in the voice message circuit, wherein the audio message is played through the speaker in response to activation of the switch.

15. The method as claimed in claim 14 wherein the switch is coupled to a transparent plate, wherein the transparent plate is connected to the frame and covers the picture in the frame, wherein the switch is activated by touching the transparent plate.

16. An apparatus for producing a still picture and an audio message associated with the still picture in a frame at a remote location comprising:

means for generating an electrical representation of the picture;

means for generating an electrical representation of the audio message associated with the picture;

means for transmitting the electrical representations of the picture and the audio message over a transmission medium coupled to the remote location;

means for receiving the electrical representations of the picture and the audio message from the transmission medium at the remote location;

means for producing the still picture from the received electrical representation of the picture;

a frame at the remote location for displaying the still picture;

voice storage means attached to the frame for storing the received electrical representation of the audio message associated with the picture;

means for inputting the electrical representation of the audio message into the voice storage means;

switch means attached to the frame and coupled to the voice storage means for initiating the playing of the audio message associated with the picture; and speaker means connected to the frame and coupled to the voice storage means for playing the associated audio message, wherein the associated audio message is played through the speaker means in response to activation of the switch means.

17. The apparatus as claimed in claim 16 further comprising a transparent plate attached to the frame and covering the displayed still picture and through which the displayed still picture is visible, wherein the transparent plate is coupled to the switch means and wherein the audio message associated with the picture is played through the speaker means in response to touching of the transparent plate.

18. The apparatus as claimed in claim 16 wherein the voice storage means comprises a processing unit and a memory means, wherein the audio message associated with the picture is stored in the memory means.

* * * * *